United States Patent
Terada et al.

(10) Patent No.: US 10,459,235 B2
(45) Date of Patent: Oct. 29, 2019

(54) HEAD-MOUNTED DISPLAY

(71) Applicant: Brother Kogyo Kabushiki Kaisha, Nagoya-shi, Aichi-ken (JP)

(72) Inventors: Kohei Terada, Nagoya (JP); Miyuki Kusuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 16 days.

(21) Appl. No.: 15/708,204

(22) Filed: Sep. 19, 2017

(65) Prior Publication Data

US 2018/0003989 A1   Jan. 4, 2018

Related U.S. Application Data

(63) Continuation of application No. PCT/JP2016/077644, filed on Sep. 20, 2016.

(30) Foreign Application Priority Data

Sep. 30, 2015  (JP) .................... 2015-192444

(51) Int. Cl.
  *G06F 3/033*   (2013.01)
  *G02B 27/01*   (2006.01)

(52) U.S. Cl.
  CPC .. *G02B 27/0176* (2013.01); *G02B 2027/0154* (2013.01); *G02B 2027/0159* (2013.01)

(58) Field of Classification Search
  CPC ........... A42B 3/04; G02B 27/01; G06F 3/033; G09G 5/08
  See application file for complete search history.

(56) References Cited

U.S. PATENT DOCUMENTS

| | | | |
|---|---|---|---|
| 2005/0146488 | A1 | 7/2005 | Travers et al. |
| 2006/0007562 | A1 | 1/2006 | Willey et al. |
| 2010/0299814 | A1* | 12/2010 | Celona ............... A42B 3/04 2/422 |
| 2011/0289661 | A1* | 12/2011 | Hammond ........... A42B 3/0433 2/422 |

(Continued)

FOREIGN PATENT DOCUMENTS

| | | |
|---|---|---|
| JP | 2004-080679 A | 3/2004 |
| JP | 3797962 B2 | 7/2006 |

(Continued)

OTHER PUBLICATIONS

Apr. 3, 2018—(WO) IPRP, including Written Opinion—App PCT/JP2016/077644, Eng Tran.

(Continued)

*Primary Examiner* — Pegeman Karimi
(74) *Attorney, Agent, or Firm* — Banner & Witcoff, Ltd.

(57) ABSTRACT

A head-mounted display includes an image display device displaying an image, a mounting member that is fixed to a head of a user, a first ball joint capable of moving and holding the image display device relative to the mounting member and a second ball joint. The first ball joint can move the image display device relative to the mounting member with a first degree of freedom or a third degree of freedom smaller than the first degree of freedom. A socket can selectively change a degree of freedom of the first ball joint between the first degree of freedom and the third degree of freedom.

10 Claims, 14 Drawing Sheets

(56) References Cited

U.S. PATENT DOCUMENTS

2012/0002046 A1* 1/2012 Rapoport ................ A42B 3/04
348/143

FOREIGN PATENT DOCUMENTS

JP       2007-325105 A    12/2007
JP       2009-033308 A    2/2009

OTHER PUBLICATIONS

Dec. 6, 2016—International Search Report—Intl App PCT/JP2016/077644.
Apr. 23, 2019—(EP) Extended Search Report—App No. 16851258.0.

* cited by examiner

HEAD-MOUNTED DISPLAY

CROSS-REFERENCE TO RELATED APPLICATIONS

This application is a continuation application of PCT International Application No. PCT/JP2016/077644 which has an International filing date of Sep. 20, 2016 and designated the United States of America, and claiming priority on Patent Application No. 2015-192444 filed in Japan on Sep. 30, 2015.

TECHNICAL FIELD

The present disclosure relates to a head-mounted display.

BACKGROUND

Conventionally, a head-mounted display (hereinafter, referred to as an "HMD") has been known as a display device that is mounted on a head of a user. A method in which an image is projected on a part of the user's field of view has been proposed as a display method of the HMD. In the HMD of such a display method, it is desirable that a position within the field of view an image is to be projected is freely adjustable by the user. A shape of the head and positions of eyes of the user are different from each other for each user. Thus, it is desirable that the HMD is allowed to be adjusted about a position within the field of view an image is to be projected with precision and a high degree of freedom. In contrast thereto, there is a known head-mounted display device that is capable of adjusting a position of a display unit by using two coupling mechanisms each having 3 degrees of freedom.

SUMMARY

In some cases, an image in a real field of view is more required for a user than an image to be projected on a part of the field of view. In such cases, the user performs an operation of moving a display unit to temporarily move an image from the inside to the outside of the field of view. For the above-described head-mounted display device, the user can move an image to the outside of the field of view by widely moving the two coupling mechanisms to move the moving unit. However, for the known head-mounted display device, each coupling mechanism has 3 degrees of freedom, for example. This provides the display unit with 6 degrees of freedom. As such, in the case that the user performs an operation of moving the display unit to move an image to the outside of the field of view, moving the display unit back to the original position with high precision by the user in order to return the image to the original position within the field of view may take time equivalent to time required when the position of the display unit is first adjusted. Generally, there is a trade-off relationship between the high degree of freedom upon adjustment of the coupling mechanisms and an ease of moving the display unit that has temporarily been retracted back to the original position, and thus, both of them were not compatible in the prior art.

The object of the present disclosure is to provide a head-mounted display that is capable of making adjustments as to a position within the field of view an image is to be projected with precision and a high degree of freedom and that is capable of, after a moving operation of the display unit in order to move an image to the outside of the field of view, easily moving the display unit back to the original position with high accuracy.

An head-mounted display according to the present disclosure is a head-mounted display comprising: a display unit that displays an image; a fixed unit that is to be fixed on a head of a user; an adjustment unit that is able to move and hold the display unit relative to the fixed unit, the adjustment unit being provided with a first adjustment unit that is able to move the display unit relative to the fixed unit with a first degree of freedom or a third degree of freedom smaller than the first degree of freedom and then hold the display unit, and with a second adjustment unit that is able to move the display unit relative to the fixed unit with a second degree of freedom and then hold the display unit; and a degree-of-freedom changing unit that is able to selectively change a degree of freedom of the first adjustment unit between the first degree of freedom and the third degree of freedom.

The above and further objects and features will more fully be apparent from the following detailed description with accompanying drawings.

DETAILED DESCRIPTION

Figure 1:
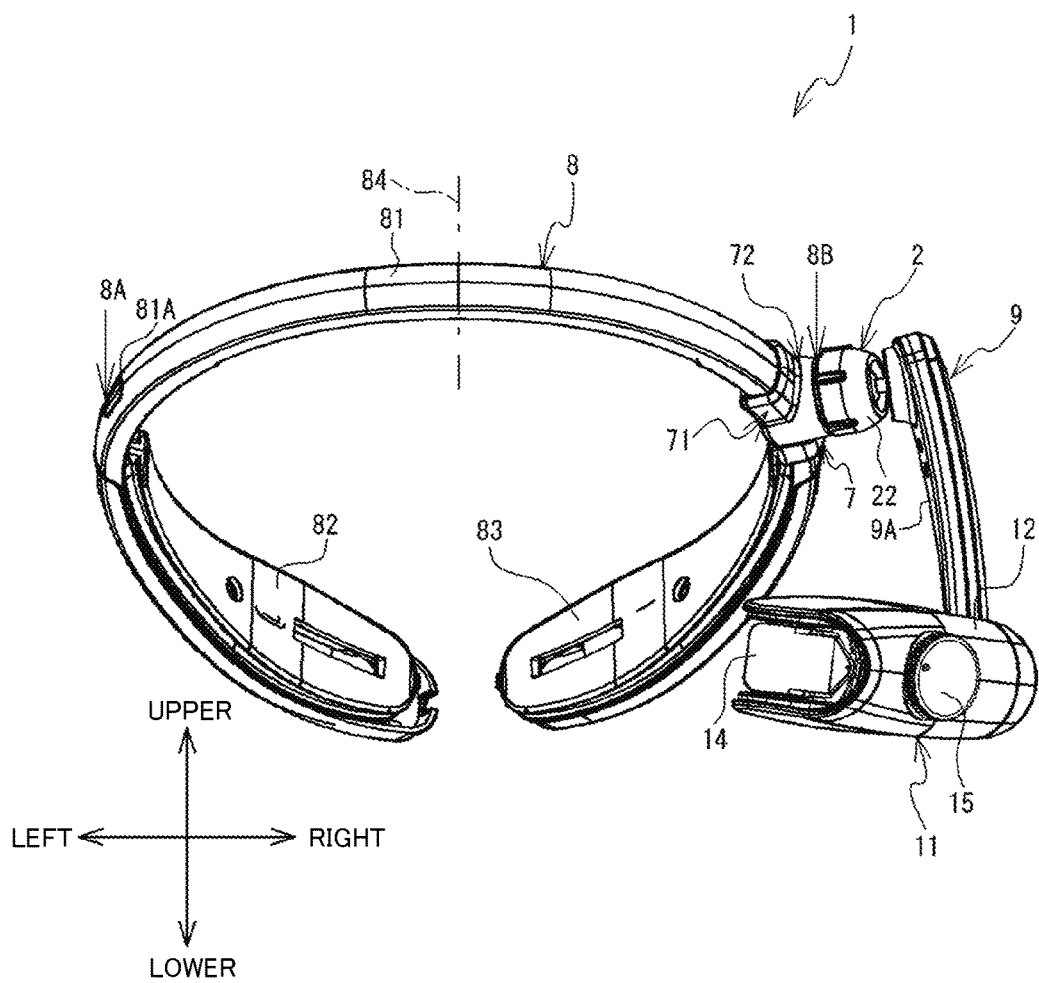
FIG. 1 is a front view of an HMD 1.

Hereinafter, an embodiment of the present disclosure will be described with reference to the accompanying drawings. As illustrated in FIG. 1, a head-mounted display (hereinafter, referred to as an "HMD") 1 is an optical transmission type see-through HMD. The HMD 1 comprises a mounting member 8, a connector 9 and an image display device 11. Light of a landscape in front of eyes of a user is transmitted through a half mirror 14 of the liquid crystal device 11 and is directly guided to the eye of the user. A projection type of the HMD 1 is a virtual image projection type. The half mirror 14 reflects light of an image which is displayed on a liquid crystal panel accommodated in the image display device 11 toward one eye of the user. The HMD 1 allows the user to recognize an image in a state in which the image overlaps the landscape in front of the eyes.

Hereinafter, an upper side, a lower side, a left side, a right side, a front side and a rear side of the HMD 1 will be defined for easy understanding of the drawings. The front side, the rear side, the left side and the right side of the HMD 1 respectively correspond to the upper side, the lower side, the right side and the left side in FIG. 3, for example. The upper side and the lower side of the HMD 1 correspond to the upper side and the lower side in FIG. 2, for example. The upper side, the lower side, the left side, the right side, the front side and the rear side of the HMD 1 respectively correspond to an upper side, a lower side, a right side, a left side, a front side and a rear side for a user on which the mounting member 8 is mounted.

<Mounting Member 8>

Figure 2:
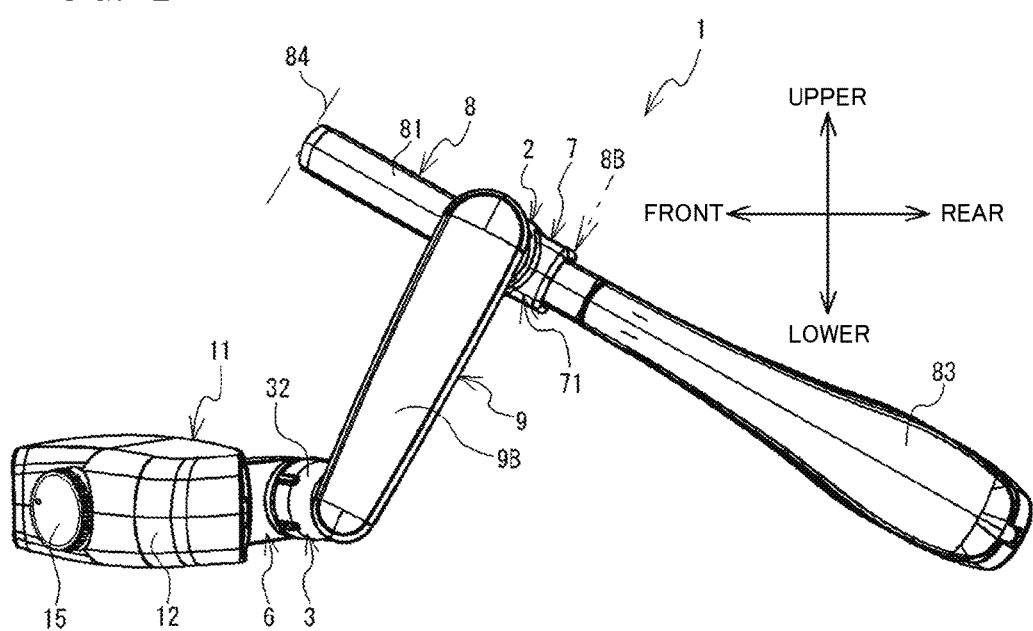
FIG. 2 is a right side view of the HMD 1.
Figure 3:
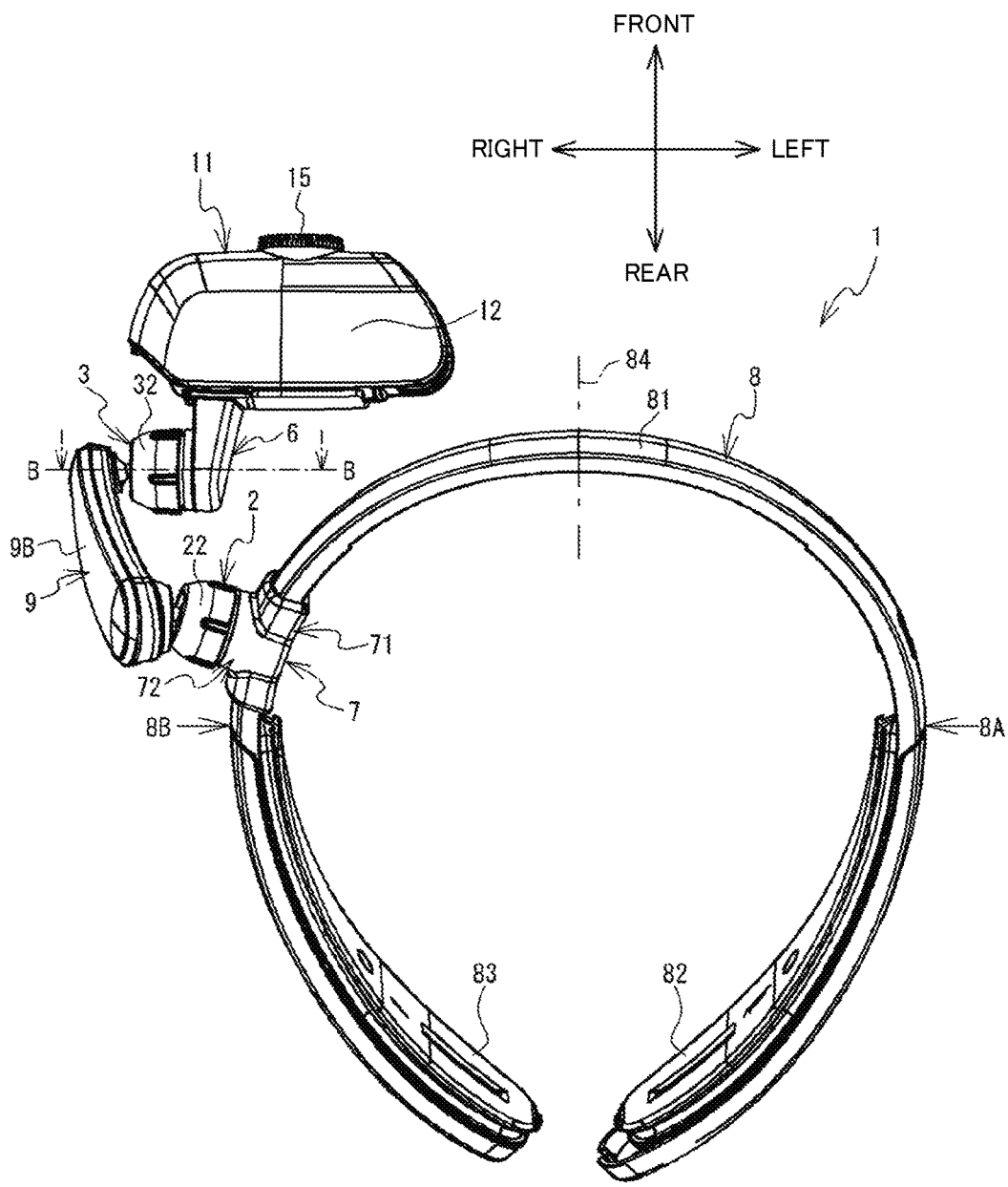
FIG. 3 is a plan view of the HMD 1.

As illustrated in FIG. 1 to FIG. 3, the mounting member 8 is made of a flexible material such as resin or metal (for example, stainless steel). The mounting member 8 is provided with a first part 81 and second parts 82 and 83. Hereinafter, description will be given by dividing the mounting member 8 into the first part 81 and the second parts 82 and 83 for convenience in understanding. The mounting member 8 is actually a single member as a whole without being divided into separate parts such as the first part 81 and the second parts 82 and 83.

The first part 81 and the second parts 82 and 83 are elongated plate-shaped members that are curved. The first part 81 is a part extending between a position 8A and a position 8B of the mounting member 8 in a right and left direction. The first part 81 is curved forward in a convex shape. The position 8A is located on the left side with respect to the center 84 in the right and left direction of the mounting member 8. The position 8B is located on the right side with respect to the center 84 in the right and left direction of the mounting member 8. The second part 82 is a part extending rearward from the position 8A of the mounting member 8. The second part 83 is a part extending rearward from the position 8B of the mounting member 8. The second parts 82 and 83 extend in such directions as to be closer to each other at rear ends thereof. The mounting member 8 is mounted on a head of a user in a state in which the first part 81, the second parts 82 and 83 are brought into contacted with the front head region, the right side head region and the left side head region of the user, respectively. In this state, the first part 81 extends in the right and left direction along the forehead of the user. Hereafter, an area enclosed by the first part 81 and the second parts 82 and 83 of the mounting member 8 may be called "the inside of the mounting member 8" while a side opposite to the inside of the mounting member 8 may be called "the outside of the mounting member 8".

As illustrated in FIG. 1, the first part 81 is provided with a hole 81A penetrating from the outside to the inside at the front of the position 8A. The first part 81 is provided with a hole (not illustrated) penetrating from the outside to the inside at the front of the position 8B. A connection member 7 described later is connected to such a position as to overlap the hole not illustrated. The connection member 7 may be connected to such a position as to overlap the hole 81A.

<Connector 9>

Figure 4:
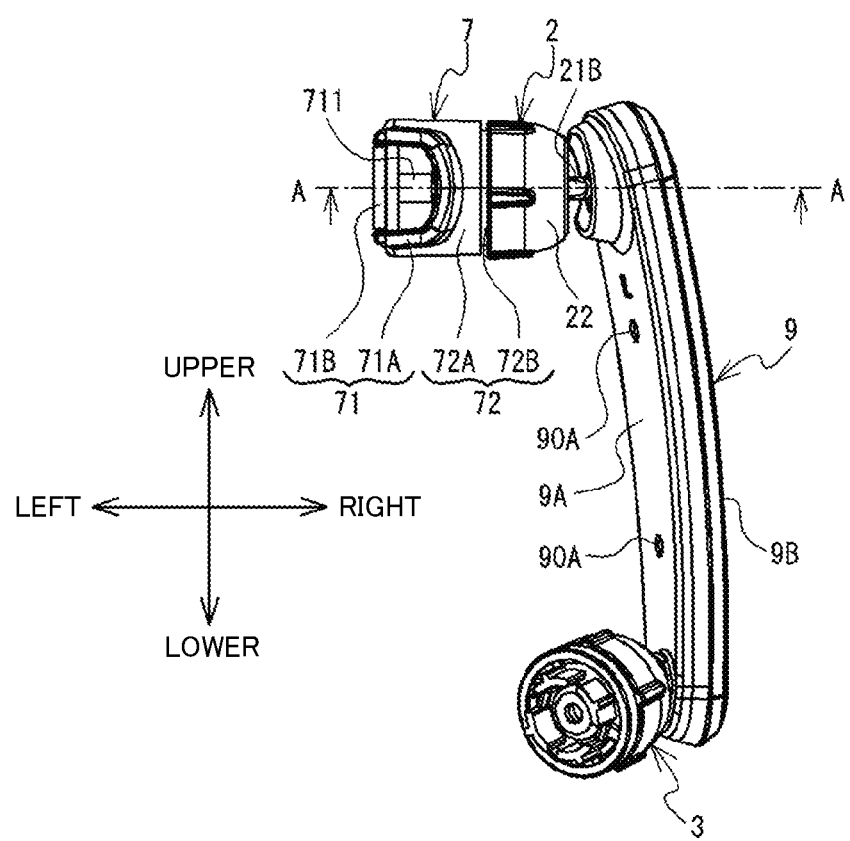
FIG. 4 is a front view of a connector 9.
Figure 5:
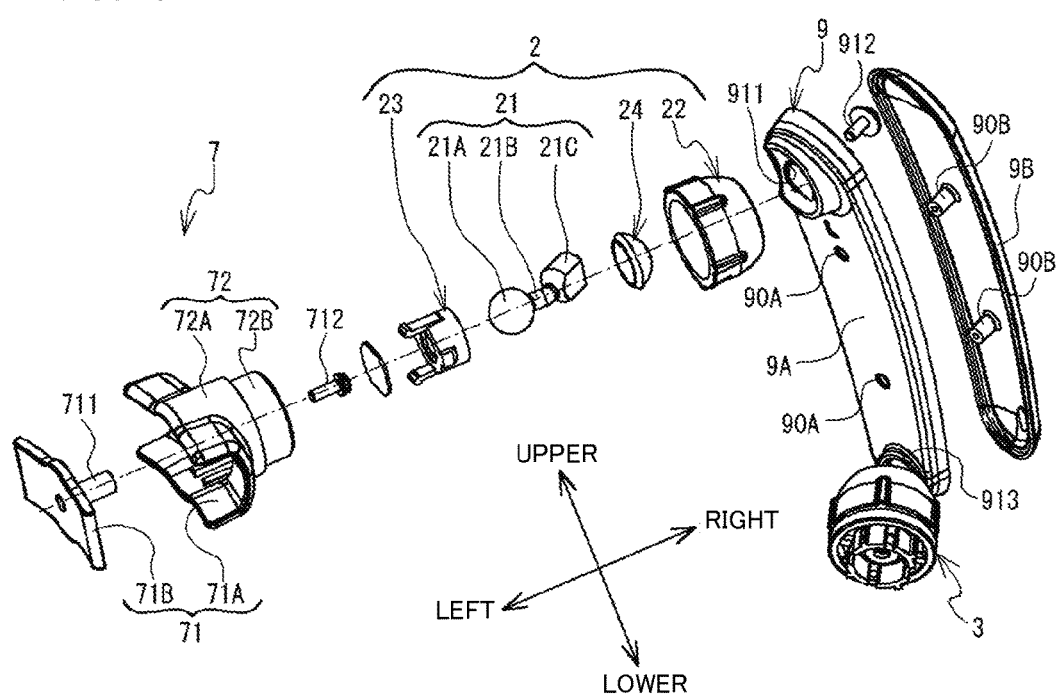
FIG. 5 is an exploded perspective view of the connector 9, a first ball joint 2 and a connection member 7.

As illustrated in FIG. 4, the connector 9 is substantially a rod shape. The connector 9 is made of resin, metal, or the like. The connector 9 extends in an upper and lower direction when viewed from the front. More specifically, as illustrated in FIG. 2, the connector 9 extends such that a lower end of the connector 9 is inclined forward with respect to the upper and lower direction. The connector 9 includes a space inside thereof. As illustrated in FIG. 5, the connector 9 includes a first member 9A and a second member 9B. The space inside the connector 9 is defined by covering an opening at the right of the first member 9A with the second member 9B. The first member 9A is provided with two circular holes 90A that penetrate therethrough in the right and left direction. The second member 9B is provided with two cylindrical protruding portions 90B that protrude leftward. The second member 9B is fixed to the first member 9A by fitting each protruding portion 90B into each hole 90A.

As illustrated in FIG. 1, an upper end of the connector 9 is connected with the mounting member 8 through a first ball joint 2 and the connection member 7 that are described later. As illustrated in FIG. 2 and FIG. 3, the lower end of the connector 9 is connected with the image display device 11 through a second ball joint 3 and a connection member 6 that are described later. The image display device 11 is attached with the mounting member 8 by the connector 9. The connector 9 holds the image display device 11 at a position spaced from the mounting member 8. The connector 9 can dispose the half mirror 14 of the display casing 11 in front of a left eye of a user in a state in which the mounting member 8 is mounted on a head of the user.

<Image Display Device 11>

As illustrated in FIG. 1 to FIG. 3, the image display device 11 includes a casing 12. The casing 12 has an approximately rectangular parallelepiped shape with curved corners. The casing 12 has a hollow box shape. A left side of the casing 12 is opened. A left side of a lens unit accommodated in the casing 12 is exposed. At an opening of the casing 12, the half mirror 14 is provided. As illustrated in FIG. 3, the connection member 6 described later is connected to a rear surface of the casing 12. The casing 12 accommodates the lens unit, a focus adjustment mechanism and a liquid crystal unit therein. The half mirror 14, the lens unit and the liquid crystal unit are arranged from the left side to right side in this order. The focus adjustment mechanism includes an operation member 15. The operation member 15 is provided on a front surface of the casing 12.

The liquid crystal unit emits an image light by displaying an image. In the present disclosure, a two-dimensional display device such as a digital mirror device (DMD) and an organic electroluminescence (EL) may be used instead of the liquid crystal unit. In addition, a retinal scanning display, which projects two-dimensionally scanned light on a retina of a user, may be used. The lens unit leads the image light emitted from the liquid crystal unit to the half mirror 14. The focus adjustment mechanism moves the lens unit in the right and left direction in accordance with the rotation of the operation member 15. The user can perform a focus adjustment of the image display device 11 by rotating the operation member 15.

The half mirror 14 has a rectangular plate shape. In both surfaces of the half mirror 14, one surface faces diagonally right rearward. In both surfaces of the half mirror, the other surface faces diagonally left forward. The half mirror 14 can reflect a part (for example, 50%) of incident light and can transmit the other part of the light therethrough. The half mirror 14 can reflect image light, which passes through the lens unit and is incident from a right side, to a rear side. A user can visually perceive a virtual image with the eye on the basis of the image light that is reflected to the rear side by the half mirror 14. In addition, the half mirror 14 can allow external light to be transmitted therethrough to the rear side. In the present disclosure, instead of the half mirror 14, a transmissive optical path deflection member such as a prism and a diffraction lattice may be used.

<Connection member 7>

As illustrated in FIGS. 4 and 5, the connection member 7 includes a coupling portion 71 and a cylindrical portion 72. The coupling portion 71 detachably couples the connection member 7 to the mounting member 8 (see FIG. 1 to FIG. 3). The coupling portion 71 includes an outside portion 71A and an inside portion 71B. The outside portion 71A contacts the upper side, the lower side and the outside of the mounting member 8. The inside portion 71B contacts the inside of the mounting member 8. The inside portion 71B includes a cylindrical protruding portion 711 that protrudes rightward. The outside portion 71A is provided with a hole (not illustrated) penetrating in the right and left direction at a portion that is brought into contact with the outside of the mounting member 8. As illustrated in FIG. 5, a screw 712 is inserted into the hole (not illustrated) of the outside portion 71A from the right side to the left side. The screw 712 is threadedly engaged with the protruding portion 711 of the inside portion 71B. The outside portion 71A and the inside portion 71B are fixed by the screw 712 with the mounting member 8 therebetween.

The cylindrical portion 72 is a cylindrical member. The cylindrical portion 72 protrudes from the outside portion 71A of the coupling portion 71 rightward. The cylindrical portion 72 is provided with a first cylindrical portion 72A and a second cylindrical portion 72B that are different in diameter of outer surfaces thereof. The second cylindrical portion 72B is disposed at the right side of the first cylindrical portion 72A. A diameter of an outer surface of the second cylindrical portion 72B is smaller than that of the first cylindrical portion 72A. The second cylindrical portion 72B includes a space therein. A left end of the second cylindrical portion 72B is closed by a bottom portion 721 (see FIG. 8). Screw threads are cut on the outer surface of the second cylindrical portion 72B. To the second cylindrical portion 72B, a socket 22 of the first ball joint 2 described later is connected.

<First Ball Joint 2>

Figure 6:
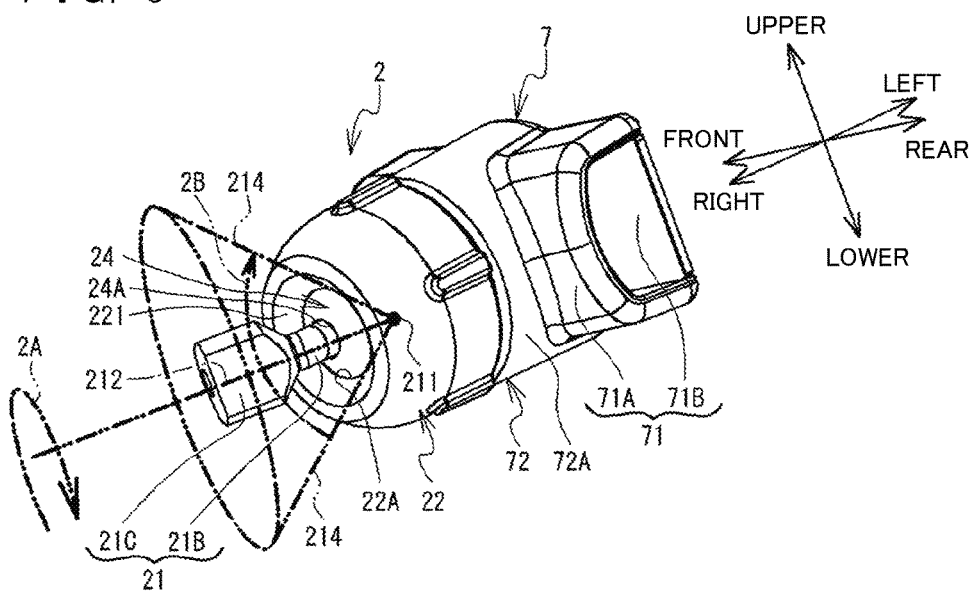
FIG. 6 is a perspective view of the first ball joint 2 (with a socket 22).
Figure 7:
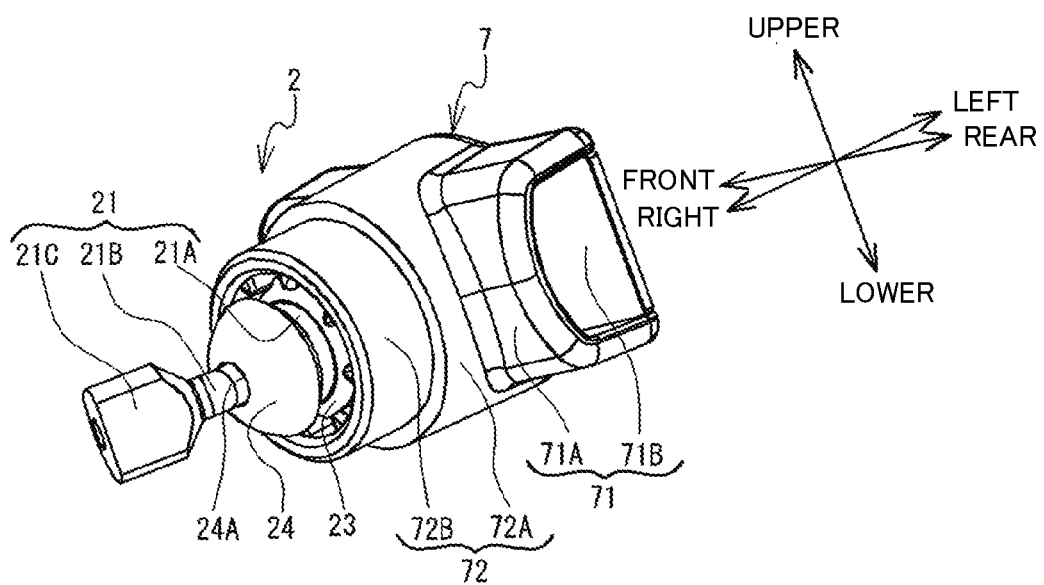
FIG. 7 is a perspective view of the first ball joint 2 (without the socket 22).
Figure 8:
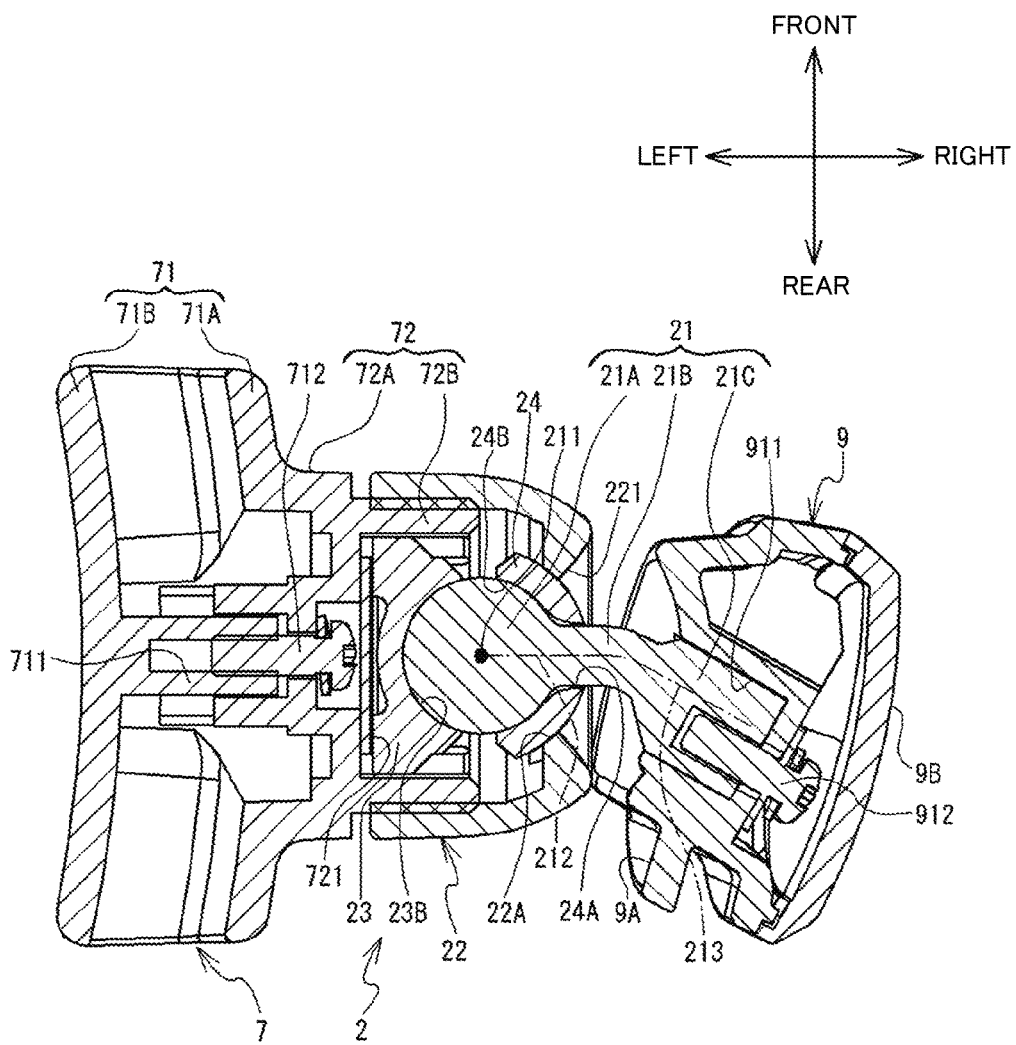
FIG. 8 is a cross-sectional view taken along line A-A in a direction denoted by an arrow in FIG. 4.

As illustrated in FIG. 5 to FIG. 8, the first ball joint 2 is provided with a ball stud 21, the socket 22, a receiving portion 23 and a pressing portion 24. The ball stud 21 includes a sphere portion 21A, a rod portion 21B and a base portion 21C. The sphere portion 21A is a spherical portion. The rod portion 21B is a cylindrical portion extending rightward from the sphere portion 21A. A diameter of a cross-section of the rod portion 21B is smaller than a diameter of the sphere portion 21A. As illustrated in FIG. 8, the rod portion 21B extends along a virtual line 212 radially extending from the center 211 of the sphere portion 21A, bends diagonally right rearward, and further extends along a virtual line 213. The base portion 21C is connected to the rod portion 21B at a side opposite to the sphere portion 21A. As illustrated in FIG. 5, at an upper end portion of the first member 9A of the connector 9, a concave portion 911 is provided. As illustrated in FIG. 8, the base portion 21C of the ball stud 21 is fit into the concave portion 911 from the left side. A hole (not illustrated) is formed in a bottom portion of the concave portion 911 so as to penetrate the bottom portion in the right and left direction. A screw 912 is inserted into the hole from the right side to the left side. The screw 912 is threadedly engaged with a threaded hole provided at the base portion 21C of the ball stud 21. This allows the ball stud 21 to be fixed to the connector 9 by the screw 912.

The receiving portion 23 is accommodated in the second cylindrical portion 72B of the connection member 7. The receiving portion 23 is made of an elastically deformable rubber that functions as a cushioning material. A left side surface of the receiving portion 23 is in contact with the bottom portion 721 of the second cylindrical portion 72B. The receiving portion 23 is provided with a circularly recessed concave portion 23B on a right side surface thereof. The concave portion 23B is in contact with substantially the left half of the sphere portion 21A of the ball stud 21 from the left side. As illustrated in FIG. 7, the pressing portion 24 is hemispheric. An opening of the pressing portion 24 faces leftward. The pressing portion 24 is made of an elastically deformable rubber that functions as a cushioning material. The pressing portion 24 is provided with a circular hole 24A that penetrates in the right and left direction. The rod portion 21B of the ball stud 21 is inserted into the hole 24A. A diameter of the hole 24A is similar to the diameter of the cross-section of the rod portion 21B of the ball stud 21. As illustrated in FIG. 8, a wall portion 24B corresponding to an inner surface of the pressing portion 24 is in contact with substantially the right half of the sphere portion 21A of the ball stud 21 from the right side. The sphere portion 21A is sandwiched between the concave portion 23B of the receiving portion 23 and the wall portion 24B of the pressing portion 24 on both sides.

The socket 22 is a cylindrical member extending in the right and left direction. An inner diameter of the socket 22 is similar to an outer diameter of the second cylindrical portion 72B of the connection member 7. Screw threads are cut at a left end of an inner surface of the socket 22. The screw threads are threadedly engaged with screw threads cut on the outer surface of the second cylindrical portion 72B. This allows the socket 22 to be connected to the connection member 7. The sphere portion 21A of the ball stud 21, the receiving portion 23 and the pressing portion 24 are accommodated in the space surrounded by the second cylindrical portion 72B and the socket 22.

As illustrated in FIG. 6, at a right end of the socket 22, a wall portion 221 extending so as to be curved toward the center is provided. A circular hole 22A is formed in the wall portion 221 so as to penetrate the wall portion 221 in the right and left direction. The rod portion 21B of the ball stud 21 is inserted into the hole 22A. An inner end of the wall portion 221 is brought into contact with an outer surface of the pressing portion 24 from the right side. A part of the right side of the pressing portion 24 extrudes from the hole 22A outside the socket 22.

As illustrated in FIG. 8, the inner end of the wall portion 221 of the socket 22 presses against the pressing portion 24 leftward in a state that the socket 22 is threadedly engaged with the second cylindrical portion 72B of the connection member 7. The sphere portion 21A of the ball stud 21 that is in contact with the wall portion 24B of the pressing portion 24 is moved leftward by the pressure of the pressing portion 24 and pressed against the receiving portion 23. Thus, the sphere portion 21A is maintained in a state sandwiched between the receiving portion 23 and the pressing portion 24 on both sides.

A distance between the bottom portion 721 of the second cylindrical portion 72B and the wall portion 221 of the socket 22 changes depending on a degree the socket 22 is threadedly engaged with the second cylindrical portion 72B. Depending on the distance between the bottom portion 721 and the wall portion 221, a force with which the wall portion 221 of the socket 22 presses the pressing portion 24 and a forth with which the receiving portion 23 and the pressing portion 24 sandwich the sphere portion 21A therebetween change. Depending on a forth with which the wall portion 221 of the socket 22 presses the pressing portion 24, a frictional force between the wall portion 221 and the pressing portion 24 changes. Hereafter, the frictional force is called a "first frictional force". As the first frictional force is large, the pressing portion 24 is hard to move relative to the socket 22. Depending on a force with which the receiving portion 23 and the pressing portion 24 sandwich the sphere portion 21A therebetween, a frictional force between the receiving portion 23 and the pressing portion 24, and the sphere portion 21A changes. Hereafter, the frictional force is called a "second frictional force". As the second frictional force is large, the sphere portion 21A is hard to move relative to the receiving portion 23 and the pressing portion 24. In the present embodiment, the material and the shape of each member are selected such that the first frictional force is larger than the second frictional force. The frictional force between the members can be adjusted to desired magnitude relation depending on the coefficient of friction of the material itself as well as deformability due to the surface hardness, surface asperities, and the contact area and the like.

Both of the first frictional force and the second frictional force are small in a state that the bottom portion 721 and the wall portion 221 are separated from each other. In the case that a force by a user acts on a side of the base portion 21C of the ball stud 21, the movement of the pressing portion 24 relative to the socket 22 is permitted, and the movement of the sphere portion 21A relative to the receiving portion 23 and the pressing portion 24 is permitted. Accordingly, as illustrated in FIG. 6, the ball stud 21 is rotatable about the virtual line 212 radially extending from the center 211 of the sphere portion 21A in a direction denoted by an arrow 2A. The ball stud 21 is movable in a range in which the rod portion 21B does not contact the hole 22A of the wall portion 221 of the socket 22. In other words, the ball stud 21 is movable in a direction denoted by an arrow 2B within a range defined by a virtual conical surface 214 formed by connecting the center 211 and the inner end of the wall portion 221. In the case that the ball stud 21 moves in the directions denoted by the arrows 2A and 2B, the pressing portion 24 also moves with the movement of the ball stud 21. That is, the moving direction of the ball stud 21 relative to the receiving portion 23 and the moving direction of the pressing portion 24 relative to the receiving portion 23 are coincident. The movement at this time corresponds to a part of rotating movement about two axes that are orthogonal to the virtual line 212 and are orthogonal to each other (a first axis extending in a front and rear direction and a second axis extending in the upper and lower direction, for example). In FIG. 6, assuming that the right and left direction is an X axis, the front and rear direction is a Y axis, and the upper and lower direction is a Z axis, the movement about the virtual line 212 is represented by a rotation Xθ about the X axis, and the movement within the conical surface 214 is represented by a synthesis of a rotation Yθ about the Y axis and a rotation Zθ about the Z axis.

As the bottom portion 721 and the wall portion 221 are closer to each other, the first frictional force and the second frictional force are stronger. In the present embodiment, the movement of the pressing portion 24 relative to the socket 22 is first restricted by the first frictional force. As described above, the diameter of the hole 24A of the pressing portion 24 is similar to the diameter of the cross-section of the rod portion 21B of the ball stud 21. Thus, in the case that a force by a user acts on the side of the base portion 21C of the ball stud 21 in a state that the movement of the pressing portion 24 relative to the socket 22 is restricted, the movement of the ball stud 21 in the direction denoted by the arrow 2B is restricted. It is assumed that the movement of the sphere portion 21A relative to the receiving portion 23 and the pressing portion 24 is not restricted by the second frictional force. Thus, in the case that a force by a user acts on the side of the base portion 21C of the ball stud 21, the movement of the sphere portion 21A relative to the receiving portion 23 and the pressing portion 24 is permitted. This maintains the ball stud 21 in a state rotatable in the direction denoted by the arrow 2A. In other words, a range in which the ball stud 21 can relatively move relative to the receiving portion 23 (the arrows 2A and 2B) is larger than a range in which the ball stud 21 can relatively move relative to the pressing portion 24 (the arrow 2A).

Furthermore, in the case that the bottom portion 721 and the wall portion 221 are closer to each other, the movement of the sphere portion 21A relative to the receiving portion 23 and the pressing portion 24 is then restricted by the second frictional force. In this case, when a force by a user acts on the side of the base portion 21C of the ball stud 21, the rotation of the ball stud 21 in the direction denoted by the arrow 2A is restricted. Accordingly, the first ball joint 2 changes to an immovable state relative to the connection member 7.

Hereafter, in the first ball joint 2, a state in which the socket 22 is tightened such that the ball stud 21 is rotatable in the direction denoted by the arrow 2A and the ball stud 21 is movable in the direction denoted by the arrow 2B is referred to as a first state. A state in which the socket 22 is tightened such that the movement of the ball stud 21 in the direction denoted by the arrow 2B is restricted and the ball stud 21 is rotatable in the direction denoted by the arrow 2A is referred to as a second state. A state in which the socket 22 is tightened such that the rotation of the ball stud 21 in the direction denoted by the arrow 2A is restricted and the movement of the ball stud 21 in the direction denoted by the arrow 2B is restricted is referred to as a third state. The rotation of the ball stud 21 of the first ball joint 2 is referred to as a "rotation of the first ball joint 2".

In the above description, the first frictional force and the second frictional force are larger than the force acting on the first ball joint 2 due to the gravity acting on the connector 9, the image display device 11, and the like. Thus, in the case that a force by a user does not act on the side of the base portion 21C of the ball stud 21, the position of the first ball joint 2 relative to the connection member 7 is fixed even in any of the first state to the third state. In other words, the first ball joint 2 does not rotate due to the gravity of the connector 9, the image display device 11 and the like.

<Connection Member 6>

As shown in FIG. 3, the connection member 6 has substantially a prism shape that extends in the front and rear direction. A front surface of the connection member 6 is connected to a rear surface of the image display device 11 described later. The connection member 6 includes a cylindrical portion 62 (see FIG. 9 to FIG. 11) protruding rightward from a right surface at a rear end thereof. The cylindrical portion 62 includes a space therein. A left end of the cylindrical portion 62 is closed by a bottom portion 621 (see FIG. 11). Screw threads are cut on an outer surface of the cylindrical portion 62. The cylindrical portion 62 is connected with a socket 32 of the second ball joint 3 described later.

<Second Ball Joint 3>

Figure 9:
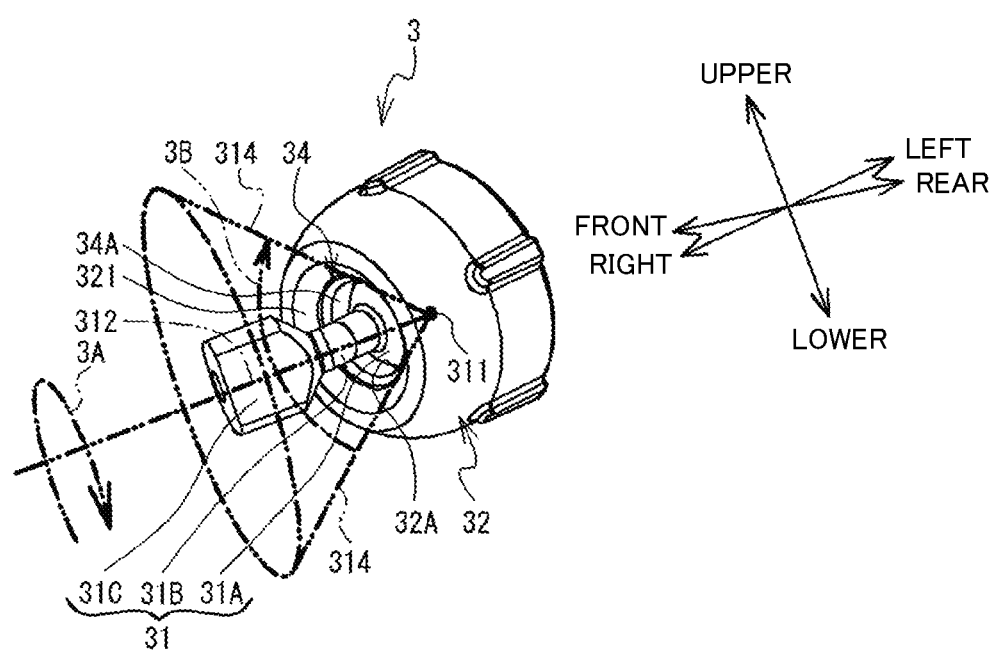
FIG. 9 is a perspective view of a second ball joint 3 (with the socket 22).
Figure 10:
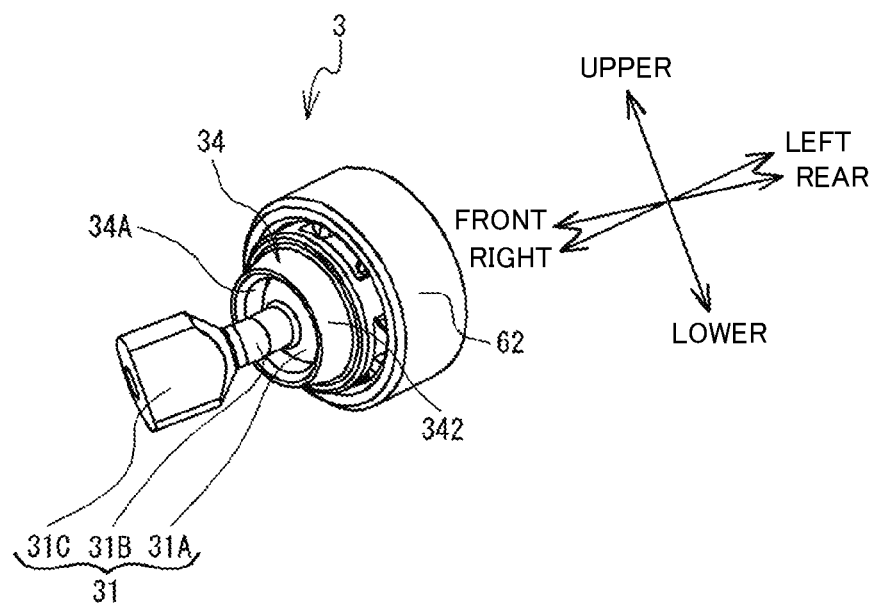
FIG. 10 is a perspective view of the second ball joint 3 (without the socket 22).
Figure 11:
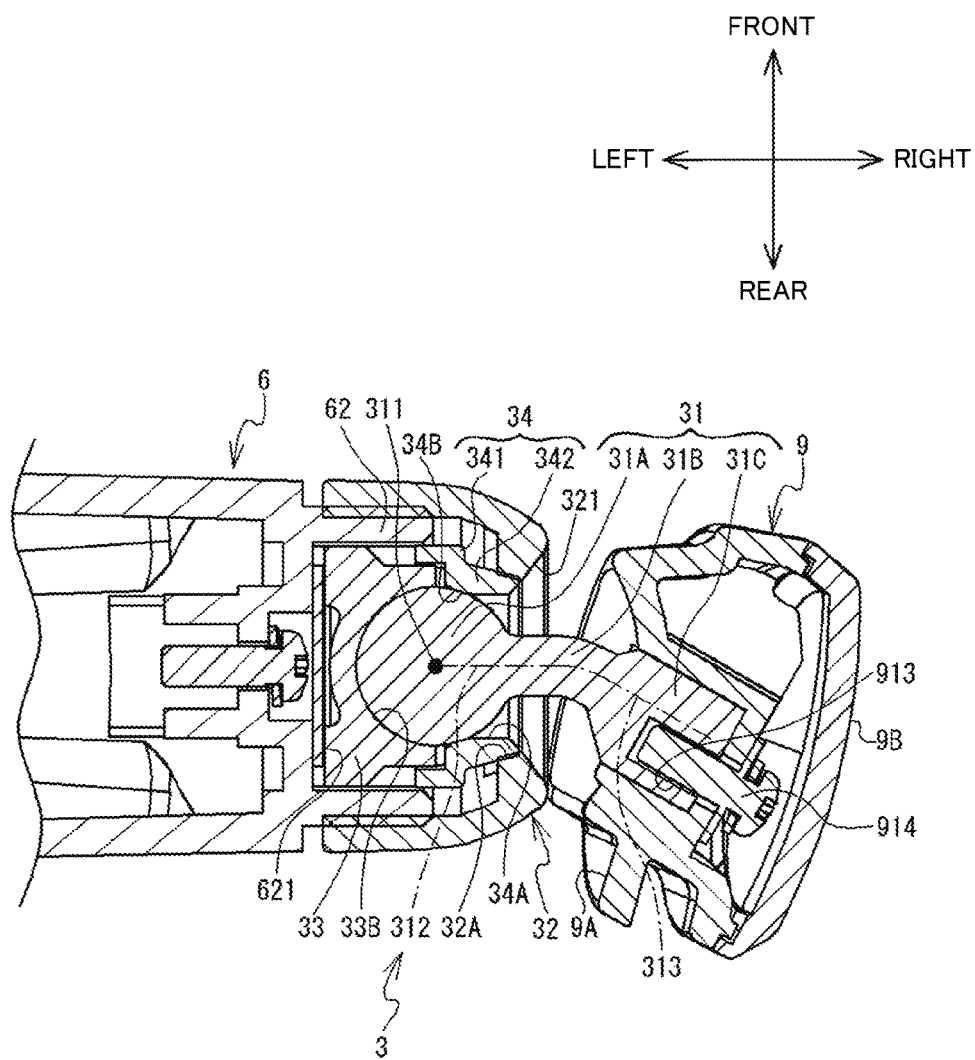
FIG. 11 is a cross-sectional view taken along line B-B in a direction denoted by an arrow in FIG. 3.

As illustrated in FIG. 9 to FIG. 11, the configuration of the second ball joint 3 is similar to the configuration of the first ball joint 2 except for a part of the configuration. Hereafter, the description of the second ball joint 3 is omitted or simplified in order to avoid an overlap with the description of the first ball joint 2. The second ball joint 3 is provided with a ball stud 31, the socket 32, a receiving portion 33 and a pressing portion 34. The ball stud 31, the socket 32, the receiving portion 33 and the pressing portion 34 respectively correspond to the ball stud 21, the socket 22, the receiving portion 23 and the pressing portion 24 of the first ball joint 2.

The ball stud 31 is provided with a sphere portion 31A, a rod portion 31B and a base portion 31C. The shapes of the sphere portion 31A, the rod portion 31B and the base portion 31C are similar to the shapes of the sphere portion 21A, the rod portion 21B and the base portion 21C of the ball stud 21. The rod portion 31B extends along a virtual line 312 radially extending from the center 311 of the sphere portion 31A, bends diagonally right rearward and further extends along a virtual line 313. As illustrated in FIG. 5, at a lower end of the first member 9A of the connector 9, a concave portion 913 is provided. As illustrated in FIG. 11, the base portion 31C of the ball stud 31 is fit into the concave portion 913 from the left side. A hole (not illustrated) is formed in a bottom portion of the concave portion 913 so as to penetrate the bottom portion in the right and left direction. A screw 914 is inserted into the hole from the right side to the left side. The screw 914 is threadedly engaged with a threaded hole provided at the base portion 31C of the ball stud 31. This allows the ball stud 31 to be fixed to the connector 9 by the screw 914.

The receiving portion 33 is accommodated in the cylindrical portion 62 of the connection member 6. The receiving portion 33 is made of an elastically deformable rubber that functions as a cushioning material. A left side surface of the receiving portion 33 is in contact with the bottom portion 621 of the cylindrical portion 62. The receiving portion 33 is provided with a circularly recessed concave portion 33B on a right side surface thereof. The concave portion 33B is in contacts with substantially the left half of the sphere portion 31A of the ball stud 31 from the left side.

The shape of the pressing portion 34 is different from that of the pressing portion 24 of the first ball joint 2. The pressing portion 34 is substantially cylindrical. The pressing portion 34 includes a first cylindrical portion 341 and a second cylindrical portion 342 that are different in diameter of inner surfaces thereof. The second cylindrical portion 342 is arranged at the right side of the first cylindrical portion 341. A diameter of an inner surface of the second cylindrical portion 342 is smaller than that of the first cylindrical portion 341. A left end of the first cylindrical portion 341 and a right end of the second cylindrical portion 342 are opened. The pressing portion 34 is made of an elastically deformable rubber that functions as a cushioning material. A step portion 34B being a connected portion between the first cylindrical portion 341 and the second cylindrical portion 342 of an inner surface of the pressing portion 34 contacts a position located slightly right from the center in the right and left direction of the sphere portion 31A of the ball stud 31. As illustrated in FIG. 10, the rod portion 31B of the ball stud 31 is inserted into an opening 34A provided at a right end of the pressing portion 34. A diameter of the opening 34A is larger than a diameter of a cross-section of the rod portion 31B of the ball stud 31 and is similar to a diameter of a hole 32A of the socket 32 described later. The sphere portion 31A is sandwiched between the concave portion 33B of the receiving portion 33 and the step portion 34B of the pressing portion 34 on both sides.

The shape of the socket 32 is similar to that of the socket 22 of the first ball joint 2. An inner diameter of the socket 32 is similar to an outer diameter of the cylindrical portion 62 of the connection member 6. Screw threads are cut at a left end portion of an inner surface of the socket 32. The screw threads are threadedly engaged with the screw threads cut on the outer surface of the cylindrical portion 62. This allows the socket 32 to be connected to the connection member 6. The sphere portion 31A of the ball stud 31, the receiving portion 33 and the pressing portion 34 are accommodated in the space surrounded by the cylindrical portion 62 and the socket 32. A wall portion 321 and the hole 32A of the socket 32 corresponds to the wall portion 221 and the hole 22A of the socket 22, respectively. The diameter of the hole 32A is similar to that of the opening 34A of the pressing portion 34. An inner end of the wall portion 321 is in contact with an outer surface at a right end of the second cylindrical portion 342 of the pressing portion 34. The rod portion 31B of the ball stud 31 is inserted into the hall 32A.

As illustrated in FIG. 11, the inner end of the wall portion 321 of the socket 32 presses the pressing portion 34 inward in a state that the socket 32 is threadedly engaged with the cylindrical portion 62 of the connection member 6. The second cylindrical portion 342 of the pressing portion 34 is deformed so as to be reduced in its inner diameter at the right end and is brought into close contact with the sphere portion 31A of the ball stud 31. The inner end of the wall portion 321 of the socket 32 presses the pressing portion 34 leftward. The sphere portion 31A of the ball stud 31 that is in contact with the step portion 34B of the pressing portion 34 moves leftward by the pressure of the pressing portion 34 and is pressed against the receiving portion 33. Thus, the sphere portion 31A is maintained in a state sandwiched between the receiving portion 33 and the pressing portion 34 on both sides.

A distance between the bottom portion 621 of the cylindrical portion 62 and the wall portion 321 of the socket 32 changes depending on a degree the socket 32 is threadedly engaged with the cylindrical portion 62. Depending on the distance between the bottom portion 621 and the wall portion 321, the force with which the receiving portion 33 and the pressing portion 34 sandwich the sphere portion 31A therebetween changes. Depending on the forth with which the receiving portion 33 and the pressing portion 34 sandwich the sphere portion 31A therebetween, the frictional force between the receiving portion 33 and the pressing portion 34, and the sphere portion 31A changes. Hereinafter, the frictional force is called a "third frictional force". As the third frictional force is large, the sphere portion 31A is hard to move relative to the receiving portion 33 and pressing portion 34.

The third frictional force is small in a state that the bottom portion 621 and the wall portion 321 are spaced from each other. In the case that a force by a user acts on a side of the base portion 31C of the ball stud 31, the sphere portion 31A is movable relative to the receiving portion 33 and the pressing portion 34.

Accordingly, as illustrated in FIG. 9, the ball stud 31 is rotatable about the virtual line 312 radially extending from the center 311 of the sphere portion 31A in a direction denoted by an arrow 3A. The ball stud 31 is movable in a direction denoted by an arrow 3B within a range in which the rod portion 31B is not in contact with the opening 34A of the receiving portion 33. The range in which the rod portion 31B is not in contact with the opening 34A of the receiving portion 33 is a range defined by connecting the center 311 and the inner end of the wall portion 321. The movement at this time corresponds to a part of rotating movement about two axes that are orthogonal to the virtual line 312 and are orthogonal to each other (for example, a first axis extending in the right and left direction and a second axis extending in the upper and lower direction).

As the wall portion 321 and the bottom portion 621 are closer to each other, the third frictional force is stronger. The movement of sphere portion 31A relative to the receiving portion 33 and the pressing portion 34 is restricted by the third frictional force. Thus, in the case that a force by a user acts on the side of the base portion 31C of the ball stud 31, the rotation of the ball stud 31 in the direction denoted by the arrow 3A is restricted and the movement of the ball stud 21 in the direction denoted by the arrow 3B is restricted. Accordingly, the second ball joint 3 changes to an immovable state relative to the connection member 6.

Similarly to the first ball joint 2, depending on a degree the socket 32 is fit into the cylindrical portion 62, the force with which the wall portion 321 of the socket 32 presses the pressing portion 34 changes, and the frictional force between the wall portion 321 and the pressing portion 34 changes. However, as described above, the diameter of the hole 32A of the wall portion 321 is similar to that of the opening 34A of the pressing portion 34. Thus, the inner end of the wall portion 321 of the socket 32 is constantly in close contact with the outer surface at the right end of the second cylindrical portion 342 of the pressing portion 34. Thus, unlikely to the first ball joint 2, even if the frictional force between the wall portion 321 and the pressing portion 34 is small, the pressing portion 34 does not move relative to the socket 32. This does not bring about a state in which the movement of the ball stud 31 in the direction denoted by the arrow 3B only is restricted and the rotation of the ball stud 31 in the direction denoted by the arrow 3A only is permitted.

In the second ball joint 3, a state in which the socket 32 is tightened such that the ball stud 31 is rotatable in the directions denoted by the arrows 3A and 3B is hereinafter referred to as a fourth state. A state in which the socket 22 is tightened such that the rotation of the ball stud 31 in the directions denoted by the arrows 3A and 3B is restricted is referred to as a fifth state. The rotation of the ball stud 31 of the second ball joint 3 is referred to as a "rotation of the second ball joint 3".

In the case that a force by a user does not act on the side of the base portion 31C of the ball stud 31, the position of the second ball joint 3 relative to the connection member 6 is fixed in both states of the fourth state and the fifth state. In other words, the second ball joint 3 does not rotate due to the gravity of the image display device 11 and the like.

<Example of Use of HMD 1>

One example of the use of the HMD 1 is described. A user first changes a state of the first ball joint 2 to the first state by loosening the socket 22. Also, the user changes a state of the second ball joint 3 to the fourth state by loosening the socket 32. The user then wears the mounting member 8 of the HMD 1 to a head of the user. The user holds the image display device 11 with the left hand and performs a positional adjustment so as to dispose the half mirror 14 in front of the left eye.

In the case that a force caused by the movement of the image display device 11 by the user acts on the first ball joint 2, the first ball joint 2 is rotatable or movable in the directions denoted by the arrows 2A and 2B. The first ball joint 2 connects the mounting member 8 and the image display device 11 through the connector 9 and the second ball joint 3. Thus, the first ball joint 2 allows the connector 9, the second ball joint 3 and the image display device 11 to move relative to the mounting member 8. Furthermore, in the case that a force caused by the movement of the image display device 11 by the user acts on the second ball joint 3, the second ball joint 3 is rotatable or movable in the directions denoted by the arrows 3A and 3B. The second ball joint 3 connects the connector 9 and the image display device 11. Thus, the second joint 3 allows the image display device 11 to move relative to the connector 9.

As described above, the position of the image display device 11 relative to the mounting member 8 is precisely adjustable by the first ball joint 2 as well as the second ball joint 3. This allows the user to accurately dispose the image display device 11 in a desired orientation and position in front of the left eye.

The user stops applying a force on the image display device 11 after disposing the image display device 11 at the desired position in front of the left eye. In this case, the first ball joint 2 and the second ball joint 3 are fixed, and thus, the position of the image display device 11 relative to the mounting member 8 is held.

After completing the adjustment of the position of the image display device 11, the user changes the state of the first ball joint 2 from the first state to the second state by tightening the socket 22, for example. The first ball joint 2 changes to a state in which a rotation in the direction denoted by the arrow 2A only is permitted. In other words, the number of rotatable axes of the first ball joint 2 changes from three axes (virtual line 212, first axis, second axis) to one axis (virtual line 212).

Illustrated is an instance where the user desires to temporarily move the half mirror 14 of the image display device 11 out of the field of view in the above-described state. As one example, a case is taken that the field of view in front of the eye is more required than an image to be projected on a part of the field of view through the half mirror 14. In such a case, the user performs an operation of holding an end part of the connector 9 with which the image display device 11 is connected to apply a force and lift the part upward. At this time, the first ball joint 2 rotates in the direction denoted by the arrow 2A. The half mirror 14 of the image display device 11 is disposed out of the field of view. The user then stops applying a force to the connector 9. The position of the image display device 11 relative to the mounting member 8 is held.

Furthermore, illustrated is an instance where the user moves the image display device 11 back to the original position and desires to dispose the image display device 11 at a desired position in front of the left eye. In such a case, the user performs an operation of holding the end part of the connector 9 with which the image display device 11 is connected to apply a force and press the part down. At this time, the first ball joint 2 rotates in the direction denoted by the arrow 2A. Thus, the image display device 11 moves back to the original position before movement with the half mirror 14 disposed within the field of view.

<Main Action and Effect of the Present Embodiment>

Other than the display method of the HMD 1 according to the above-described embodiment, a method in which an image is projected on the user's entire field of view has been known as a display method of the HMD. In most cases, the HMD of the method in which an image is projected on the user's entire field of view comprises in advance a movable part that moves a display unit to a position where no image is projected within the user's field of view. It is only required that the movable part can move the display unit between a position where an image is projected on the user's entire field of view and the position where no image is projected on the user's field of view. Thus, the movable part is mostly configured to stop the display unit only at either of two positions.

In contrast thereto, the HMD of the method in which an image is projected on a part of the user's field of view, like the HMD1 according to the above-described embodiment, often allows commonality of a mechanism for moving the image display device 11 to a position where an image is projected to a desired position within the user's field of view and a mechanism for moving the image display device 11 to a position where no image is projected within the user's field of view. Here, a large degree of freedom of the movement of the image display device 11 is preferable for moving the image display device 11 to a position where an image is projected at a desired position within the user's field of view. Meanwhile, in the case that the image display device 11 is moved to a position where no image is projected within the user's field of view, a small degree of freedom of the movement of the image display device 11 is preferable for easily moving the image display device 11 back to the original position before movement.

The HMD 1 comprises the first ball joint 2 and the second ball joint 3. The first ball joint 2 can be changed among the first state to the third state that are different in degree of freedom by an adjustment of a degree the socket 22 is tightened. The number of rotatable axes of the first ball joint 2 decreases in the order of the first state (virtual line 212, first axis, and second axis), the second state (virtual line 212) and the third state (no axis). For example, the user can perform an adjustment for moving once the image display device 11 to a position where no image is projected within the field of view and then moving the image display device 11 back to the original position, by using the first ball joint 2 that is changed to the second state. The number of rotatable axes of the first ball joint 2 in the second state is smaller than the number of rotatable axes of the first ball joint 2 in the first state. In this case, the user can restrict the degree of freedom of the movement of the image display device 11 by the first ball joint 2. This allows the user to easily and appropriately move the image display device 11 back to the original position.

Be noted that in the case that the number of rotatable axes of the first ball joint 2 decreases in the order of the first state, the second state and the third state, the degree of freedom in the third state indicates "1 degree of freedom" or more, and does not include "0 degree of freedom", for example. The reason is that assuming that the degree of freedom in the third state includes "0 degree of freedom", the display unit cannot be moved by using the first adjustment unit that is changed to have "0 degree of freedom", and whereby, an adjustment for moving the display unit back to the original position cannot also be performed by the first adjustment unit that is changed to have "0 degree of freedom". Thus, the degree of freedom in the third state is required to be "1 degree of freedom" or more at minimum.

For example, the user can perform adjustments as to a position and an orientation in front of the left eye the image display device 11 is to be disposed, by using the first ball joint 2 in the first state and the second ball joint 3 in the fourth state. In this case, since the degree of freedom of the movement of the image display device 11 is large, the position of the image display device 11 can be adjusted more precisely. The first ball joint 2 can be used for both of an adjustment for moving the image display device 11 to a position such that no image is projected within the field of view and moving the image display device 11 back to the original position and an adjustment for moving the image display device 11 to a position where an image is projected at a desired position within the field of view. Accordingly, the HMD 1 can efficiently utilize the degree of freedom of the first ball joint 2 and the second ball joint 3. Thus, it is possible to achieve the HMD 1 that is small in size and simple in configuration. Generally, when an object is placed in a three-dimensional space, a total of 6 degrees of freedom including 3 degrees of freedom for a position and 3 degrees of freedom for an orientation (rotation) enables positioning in all states. One ball joint mechanism has 3 degrees of freedom and thus, two ball joint mechanisms are enough for fine adjustments.

Only when wearing the HMD 1 at first, the user may use the first ball joint 2 in the first state and the second ball joint 3 in the fourth state to thereby adjust the position of the image display device 11. Then, after the first ball joint 2 is changed to the second state, the user may then retract the image display device 11 out of the field of view and return the image display device 11 within the field of view using the first ball joint 2 only.

In the above description, the first ball joint 2 includes the ball stud 21, the socket 22, the receiving portion 23 and the pressing portion 24. The receiving portion 23 is in contact with the left side of the sphere portion 21A of the ball stud 21. The pressing portion 24 is in contact with the right side of the sphere portion 21A. The wall portion 221 of the socket 22 is brought into contact with the pressing portion 24 from the right side to press the pressing portion 24 leftward. Thus, the sphere portion 21A is maintained in a state sandwiched between the receiving portion 23 and the pressing portion 24 on both sides.

In the case that a degree of the socket 22 being threadedly engaged with the connection member 7 is weak, both of the first frictional force between the wall portion 221 and the pressing portion 24 and the second frictional force between the receiving portion 23 and the pressing portion 24, and the sphere portion 21A are small. In this case, the pressing portion 24 is movable relative to the socket 22, and the sphere portion 21A is movable relative to the receiving portion 23 and the pressing portion 24. Accordingly, the ball stud 21 is movable in both directions denoted by the arrows 2A and 2B (first state). In contrast, in the case that the degree of the socket 22 being threadedly engaged with the connection member 7 is strong, the first frictional force is larger than the second frictional force, and by the first frictional force, the movement of the pressing portion 24 relative to the socket 22, that is, the movement of the pressing portion 24 relative to the receiving portion 23 is restricted. Thus, the movement of the ball stud 21 in the direction denoted by the arrow 2B is restricted and the movement of the ball stud 21 in the direction denoted by the arrow 2A only is permitted (second state).

As described above, the HMD 1 can change the state of the first ball joint 2 to the first state by permitting the movement of the pressing portion 24 relative to the socket 22, that is, permitting the movement of the pressing portion 24 relative to the receiving portion 23. Also, the HMD 1 can change the state of the first ball joint 2 to the second state by restricting the movement of the pressing portion 24 relative to the socket 22, that is, by restricting the movement of the pressing portion 24 relative to the receiving portion 23. Furthermore, the HMD 1 can switch between a state that the movement of the pressing portion 24 relative to the receiving portion 23 is permitted (first state) and the state that the movement of the pressing portion 24 relative to the receiving portion 23 is restricted (second state), by adjustment of a degree the socket 22 is threadedly engaged with the connection member 7. Accordingly, the HMD 1 can easily switch the state of the first ball joint 2 (first state or second state).

When the first ball joint 2 is in the first state, the pressing portion 24 is movable relative to the receiving portion 23, and the ball stud 21 is movable in the directions denoted by the arrows 2A and 2B. Meanwhile, when the first ball joint 2 is in the second state, the movement of the pressing portion 24 relative to the receiving portion 23 is restricted, and the ball stud 21 is movable in only the direction denoted by the arrow 2A. In other words, the range (see the arrows 2A and 2B in FIG. 6) in which the ball stud 21 is relatively movable relative to the receiving portion 23 is larger than the range (see the arrow 2A in FIG. 6) in which the ball stud 21 is relatively movable relative to the pressing portion 24. Thus, the HMD 1 can make the movable range of the ball stud 21 of the first ball joint 2 that is changed to the first state larger than the movable range of the ball stud 21 of the first ball joint 2 that is changed to the second state.

In the above description, the first ball joint 2 connects to the image display device 11 through the connector 9 and the second ball joint 3. In the HMD 1, the first ball joint 2 allows the connector 9, the second ball joint 3 and the image display device 11 to move relative to the mounting member 8. Here, it is assumed that the first ball joint 2 and the second ball joint 3 are reversibly connected. In this case, when a force is applied to move the first ball joint 2 in order to move the image display device 11 such that no image is projected in the field of view, the force is also applied to the second ball joint 3, causing a probability of moving the second ball joint 3.

In contrast thereto, in the HMD 1, the state of the first ball joint 2 being a ball joint positioned nearer to the mounting member 8 is changed from the first state to the second state, which decreases the number of rotatable axes of the first ball joint 2. In this case, an adjustment for moving the image display device 11 once to a position where no image is projected within the field of view and then moving the image display device 11 back to the original position can be performed without moving the second ball joint 3.

The number of rotatable axes of the first ball joint 2 in the second state is "one" while the number of rotatable axes of the second ball joint 3 in the fourth state is "three". Thus, after having performed an adjustment as to a position within the field of view the half mirror 14 of the image display device 11 is to be disposed by using the second ball joint 3 in the fourth state, the user can easily retract the image display device 11 out of the field of view and return the image display device 11 within the field of view, by using only the first ball joint 2.

<First Modified Example>

Figure 12:
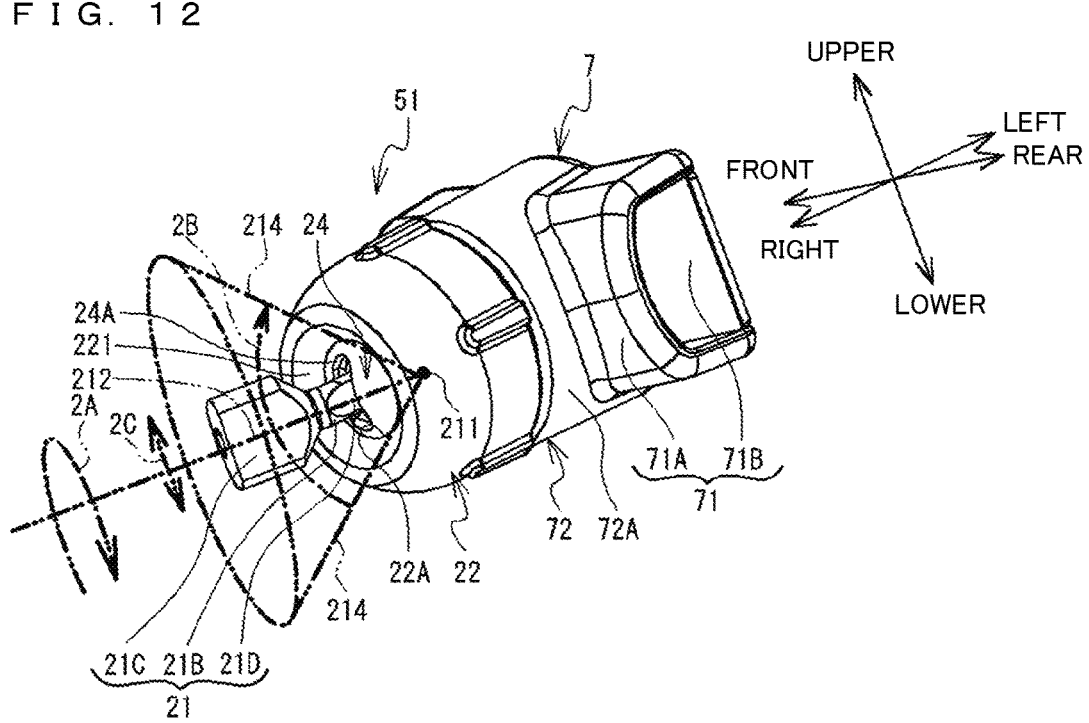
FIG. 12 is a perspective view of a first ball joint 51 in a first modified example.

The HMD 1 according to the first modified example is described. In the HMD 1 according to the first modified example, a first ball joint 51 is used in place of the first ball joint 2. The first ball joint 51 is described with reference to FIG. 12. The first ball joint 51 is different from the first ball joint 2 in the shape of the rod portion 21B of the ball stud 21 and the shape of the hole 24A of the pressing portion 24. The rest of the configuration is similar to the configuration of the first ball joint 2, and thus, the description thereof is omitted.

The rod portion 21B of the ball stud 21 of the first ball joint 51 is provided with a pair of planar portions 21D at a position crossing the hole 24A of the pressing portion 24. The pair of the planar portions 21D are opposed to each other in a specific direction (for example, a front and rear direction) perpendicular to a direction in which the rod portion 21B extends. Each planar portion 21D is formed by cutting away (for example, D-cutting) an outer surface of the rod portion 21B along a plane perpendicular to the specific direction. A length between the pair of the planar portions 21D in the specific direction is shorter than the diameter of the rod portion 21B where the pair of the planar portions 21D are not formed.

The hole 24A of the pressing portion 24 has an elongated-hole shape. The hole 24A is short in the specific direction in which the pair of the planar portions 21D of the rod portion 21B are opposed to each other and is long in the direction (for example, upper and lower direction) perpendicular to both of the direction in which the rod portion 21B extends and the specific direction. A length of the hole 24A along the shorter side is similar to the length between the pair of the planar portions 21D of the rod portion 21B and is shorter than a diameter of a part of the rod portion 21B where the pair of planar portions 21D are not formed.

When the ball stud 21 rotates relative to the pressing portion 24, the pair of the planar portions 21D of the rod portion 21B are brought into contact with the hole 24A. Thus, unlikely to the first ball joint 2, in the first ball joint 51 the rotation of the ball stud 21 relative to the pressing portion 24 about the direction in which the rod portion 21B extends is restricted.

An instance where the socket 22 is tightened such that the first ball joint 51 changes to the first state is illustrated. In the case that a force by a user acts on the side of the base portion 21C of the ball stud 21, the pressing portion 24 is movable relative to the socket 22, and the sphere portion 21A is movable relative to the receiving portion 23 and the pressing portion 24. Accordingly, similarly to the first ball joint 2, the first ball joint 51 is rotatable or movable in the directions denoted by arrows 2A and 2B.

An instance where the socket 22 is tightened such that the first ball joint 51 changes to the second state is illustrated. In the case that a force by a user acts on the side of the base portion 21C of the ball stud 21, the movement of the pressing portion 24 relative to the socket 22 is restricted. Accordingly, similarly to the first ball joint 2, the movement of the first ball joint 51 in the direction denoted by the arrow 2B is restricted. Also, in the case that the ball stud 21 intends to rotate relative to the pressing portion 24, the pair of planar portions 21D of the rod portion 21B are brought into contact with the hole 24A of the pressing portion 24, whereby the rotation of the ball stud 21 relative to the pressing portion 24 about the virtual line 212 is restricted. Accordingly, unlikely to the first ball joint 2, the rotation of the first ball joint 51 in the direction denoted by the arrow 2A is also restricted.

Meanwhile, in the case that the first ball joint 51 is in the second state, the sphere portion 21A is maintained in a state movable relative to the receiving portion 23 and the pressing portion 24. This allows the ball stud 21 to move only in a direction along the longer side of the hole 24A of the pressing portion 24, that is, in a direction denoted by an arrow 2C in FIG. 12. The movement at this time corresponds to rotational movement about one axis (for example, first axis extending in the front and rear direction) perpendicular to the virtual line 212. Thus, in the second state, the first ball joint 51 is different in the axis about which a rotation is permitted from the first ball joint 2 that rotates about the virtual line 212. Furthermore, the movable range denoted by the arrow 2C is restricted by the rod portion 21B being brought into contact with the ends of the hole 24A in the direction along the longer side.

An instance where the socket 22 is tightened such that the first ball joint 51 changes to the third state is illustrated. In this case, the movement of the sphere portion 21A relative to the receiving portion 23 and the pressing portion 24 is also restricted. Thus, in the case that a force by a user acts on the side of the base portion 21C of the ball stud 21, the movement of the ball stud 21 in the direction denoted by the arrow 2C is restricted. Accordingly, the first ball joint 51 is in an immovable state.

As described above, in the second state, the first ball joint 2 is rotatable in the direction denoted by the arrow 2B while the first ball joint 51 is rotatable in the direction denoted by the arrow 2C. Thus, the user can perform an adjustment for moving once the image display device 11 to a position where no image is projected within the field of view and then moving the image display device 11 back to the original position, by using the first ball joint 51 that is changed to the second state.

For example, the user makes an adjustment such that the image display device 11 is disposed in front of the left eye in a state that the first ball joint 51 in the second state is moved to one end in the direction denoted by the arrow 2C. Then, the user brings about a state in which no image is projected within the field of view by moving the image display device 11 to the other end in the direction denoted by the arrow 2C. This allows the user to easily move the image display device 11 back to the original position by moving the image display device 11 to the one end in the direction denoted by the arrow 2C.

<Second Modified Example>

Figure 13:
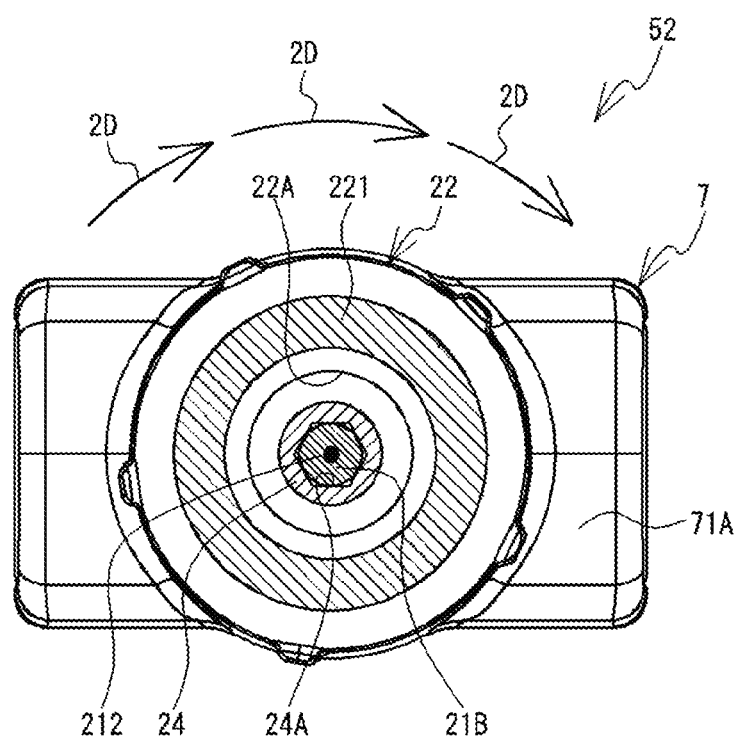
FIG. 13 is a perspective view of a first ball joint 52 in a second modified example.

The HMD 1 according to the second modified example is described. In the HMD 1 according to the second modified example, a first ball joint 52 is used in place of the first ball joint 2. The first ball joint 52 is described with reference to FIG. 13. The first ball joint 52 is different from the first ball joint 2 in that the cross-sectional form of the rod portion 21B of the ball stud 21 has a regular hexagonal shape with rounded corners, and that the shape of the hole 24A of the pressing portion 24 is regular hexagonal. The cross-sectional form of the rod portion 21B is similar to the shape of the hole 24A. The rest of the configuration is similar to the configuration of the first ball joint 2, and thus, the description thereof is omitted.

The outer surface of the rod portion 21B of the ball stud 21 of the first ball joint 52 is constructed by six planes. An angle formed by the adjacent planes of the rod portion 21B is 60 degrees. The hole 24A of the pressing portion 24 is also constructed by six planes. Since the cross-sectional form of the rod portion 21B and the shape of the hole 24A are based on hexagons of a similar size, the planes formed on the outer surface of the rod portion 21B and the planes of the hole 24 are brought into close contact with each other.

When the ball stud 21 rotates relative to the pressing portion 24, each plane of the rod portion 21B is brought into contact with each plane of the hole 24A, which prevents the ball stud 21 from rotating. However, the pressing portion 24 is made of an elastically deformable material, such as rubber. Thus, when the ball stud 21 rotates against the pressing portion 24 with a force of a predetermined strength or more, the pressing portion 24 is elastically deformed. In this case, the ball stud 21 rotates relative to the pressing portion 24 by 60 degrees, and stops in a state that each plane of the rod portion 21B is brought into contact with each plane of the hole 24A again. As such, in response to the applying of a force of a predetermined strength or more to the ball stud 21, the first ball joint 52 rotates by 60 degrees relative to the pressing portion 24.

An instance where the socket 22 is tightened such that the first ball joint 52 changes to the first state is illustrated. In the case that a force by a user acts on the side of the base portion 21C of the ball stud 21, the pressing portion 24 is movable relative to the socket 22, and the sphere portion 21A is movable relative to the receiving portion 23 and the pressing portion 24. Accordingly, similarly to the first ball joints 2 and 51, the first ball joint 52 is rotatable or movable in the directions denoted by the arrows 2A and 2B (see FIG. 6).

An instance where the socket 22 is tightened such that the first ball joint 52 changes to the second state is illustrated. In the case that a force by a user acts on the side of the base portion 21C of the ball stud 21, the movement of the pressing portion 24 relative to the socket 22 is restricted. Accordingly, similar to the first ball joint 2, the movement of the first ball joint 52 in the direction denoted by the arrow 2B is restricted (see FIG. 6).

Meanwhile, in the case that the first ball joint 52 is in the second state, the sphere portion 21A is maintained in a state movable relative to the receiving portion 23 and the pressing portion 24. In contrast thereto, in the case that the ball stud 21 intends to rotate relative to the pressing portion 24, each plane of the rod portion 21B is brought into contact with each plane of the hole 24A, which prevents the rod portion 21B from rotating. Here, in the case that a force of a predetermined strength or more acts on the side of the base portion 21C of the ball stud 21, the ball stud 21 rotates by 60 degrees in response to the pressing portion 24 being elastically deformed as described above. Accordingly, unlikely to the first ball joint 2, the first ball joint 52 is allowed to be rotated by 60 degrees about the virtual line 212 (see FIG. 6) radially extending from the center 211 of the sphere portion 21A as denoted by an arrow 2D. In other words, the first ball joint 52 in the second state is smaller in the number of positions where a rotation about the virtual line 212 stops than the first ball joint 52 in the first state in which a rotation about the virtual line 212 at a non-level is permitted. As described above, the movement of the pressing portion 24 relative to the receiving portion 23 is permitted in the first state while the movement of the pressing portion 24 relative to the receiving portion 23 is restricted in the second state. Thus, the number of positions where the ball stud 21 is relatively stoppable relative to the receiving portion 23 (no limit in this embodiment) is larger than the number of positions where the ball stud 2 is relatively stoppable relative to the pressing portion 24 (6 positions in this embodiment).

An instance where the socket 22 is tightened such that the first ball joint 52 changes to the third state is illustrated. The movement of sphere portion 21A relative to the receiving portion 23 and the pressing portion 24 is restricted. Thus, even if a force by a user acts on the side of the base portion 21C of the ball stud 21, the rotation of the ball stud 21 in a direction denoted by the arrow 2D is restricted. Accordingly, the first ball joint 52 is in an immovable state.

As described above, in the second modified example, by changing the state of the first ball joint 52 to the second state, the user can make the number of positions where a rotation of the first ball joint 52 is stoppable smaller than that in the first state. More specifically, the user can rotate the first ball joint 52 by 60 degrees at six levels by changing the state of the first ball joint 52 to the second state.

For example, after changing the state of the first ball joint 52 to the first state, the user adjusts the position of the image display device 11 such that the half mirror 14 is disposed in front of the left eye. Then, the user changes the first ball joint 52 to the second state. The first ball joint 52 is held in a state that it is rotated to any one of stop positions of six levels (hereinafter, referred to as a "first stop position"). Then, the user moves the image display device 11 such that an image is not projected within the field of view. In this case, the first ball joint 52 is held in a state that it is rotated to a second stop position different from the first stop position out of the stop positions of six levels. Here, in the case where the user desires to move the image display device 11 back to the original position, it is only required that the user rotates the first ball joint 52 from the second stop position to the first stop position. Thus, the user can more easily move the image display device 11 back to the original position in comparison with the case that a rotation of the first ball joint 52 about the virtual line 212 is stoppable without limit.

When the first ball joint 52 is in the first state, the pressing portion 24 is movable relative to the receiving portion 23, and the ball stud 21 is movable in the directions denoted by the arrows 2A and 2B. Meanwhile, when the first ball joint 52 is in the second state, the movement of the pressing portion 24 relative to the receiving portion 23 is restricted. At this time, the ball stud 21 is stoppable at six different positions relative to the pressing portion 24 (see the arrow 2D in FIG. 13). In other words, the number of positions where the ball stud 21 is relatively stoppable relative to the receiving portion 23 (no limit in this embodiment) is larger than the number of positions where the ball stud 21 is relatively stoppable relative to the pressing portion 24 (6 positions in this embodiment). Thus, the HMD 1 can increase the number of positions where the ball stud 21 of the first ball joint 52 that is changed to the first state is stoppable in comparison with the number of positions where the ball stud 21 of the first ball joint 52 that is changed to the second state is stoppable.

<Third Modified Example>

Figure 14:
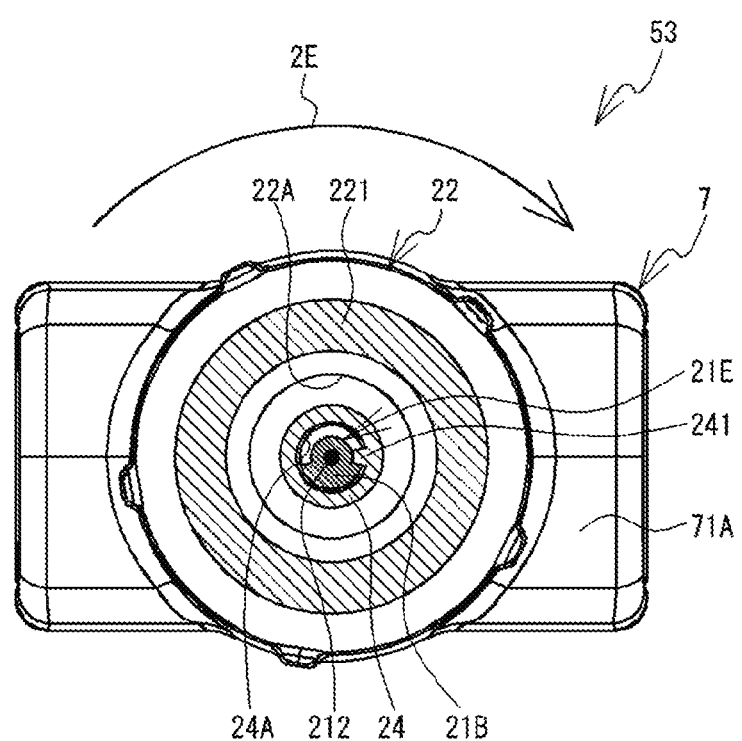
FIG. 14 is a perspective view of a first ball joint 53 in a third modified example.

The HMD 1 according to the third modified example is described. In the HMD 1 according to the third modified example, a first ball joint 53 is used in place of the first ball joint 2. With reference to FIG. 14, the first ball joint 53 is described. The first ball joint 53 is different from the first ball joint 2 in the shape of the rod portion 21B of the ball stud 21 and the shape of the hole 24A of the pressing portion 24. The rest of the configuration is similar to the configuration of the first ball joint 2, and thus, the description thereof is omitted.

The rod portion 21B of the ball stud 21 of the first ball joint 53 is provided with a cut-away portion 21E at a portion that crosses the hole 24A of the pressing portion 24. The cut-away portion 21E is formed in a substantially half area of a whole circumference thereof along the outer surface. A radius being a length from the virtual line 212 passing through the center 211 of the rod portion 21B to the cut-away portion 21E is smaller than a radius at a portion of the rod portion 21B where no cut-away portion 21E is formed.

The hole 24A of the pressing portion 24 is circular. The radius of the hole 24A is similar to the radius at the portion of the rod portion 21B where no cut-away portion 21E is formed. The hole 24A is provided with a protruding portion 241 that protrudes inward. A length of the protruding portion 241 in a protruding direction is similar to a depth of the cut-away portion 21E formed on the rod portion 21B. Thus, the portion of the outer surface of the rod portion 21B where no cut-away portion 21E is formed is in contact with a portion of the hole 24A where no protruding portion 241 is provided in a state that the rod portion 21B is inserted into the hole 24A of the pressing portion 24. Furthermore, a part of the outer surface of the rod portion 21B where the cut-away portion 21E is formed is in contact with a tip end of the protruding portion 241.

When the ball stud 21 rotates relative to the pressing portion 24, both ends in a circumferential direction of the cut-away portion 21E of the rod portion 21B are brought into contact with the protruding portion 241 of the hole 24A. Thus, in the first ball joint 53, a rotational amount when the ball stud 21 rotates relative to the pressing portion 24 about the virtual line 212 of the rod portion 21B is substantially restricted to 180 degrees.

An instance where the socket 22 is tightened such that the first ball joint 53 changes to the first state is illustrated. In the case that a force by a user acts on the side of the base portion 21C of the ball stud 21, the pressing portion 24 is movable relative to the socket 22, and the sphere portion 21A is movable relative to the receiving portion 23 and the pressing portion 24. Accordingly, similarly to the first ball joint 2, the first ball joint 53 is rotatable in the directions denoted by the arrows 2A and 2B (see FIG. 6).

An instance where the socket 22 is tightened such that the first ball joint 53 changes to the second state is illustrated. In the case that a force by a user acts on the side of the base portion 21C of the ball stud 21, the movement of the pressing portion 24 relative to the socket 22 is restricted. Accordingly, similarly to the first ball joints 2, the rotation of the first ball joint 53 in the direction denoted by the arrow 2B (see FIG. 6) is restricted.

Meanwhile, in the case that the first ball joint 53 is in the second state, the sphere portion 21A is maintained in a state movable relative to the receiving portion 23 and the pressing portion 24. However, in the case that the ball stud 21 intends to rotate relative to the pressing portion 24, the protruding portion 241 of the hole 24A are brought into contact with the both ends of the cut-away portion 21E of the rod portion 21B, which restricts the rotational range to 180 degrees. Accordingly, unlikely to the first ball joint 2, the first ball joint 53 can rotate in a range of 180 degrees about the virtual line 212 radially extending from the center 211 of the sphere portion 21A as denoted by an arrow 2E. In other words, the first ball joint 53 in the second state is smaller in the rotatable range about the virtual line 212 than the first ball joint 53 in the first state in which a rotation about the virtual line 212 by 360 degrees is permitted.

An instance where the socket 22 is tightened such that the first ball joint 53 changes to the third state is illustrated. Here, the movement of the sphere portion 21A relative to the receiving portion 23 and the pressing portion 24 is also restricted. Thus, even if a force by a user acts on the side of the base portion 21C of the ball stud 21, the rotation of the ball stud 21 in a direction denoted by the arrow 2E is restricted. Accordingly, the first ball joint 53 is in an immovable state.

As described above, in the third modified example, by changing the state of the first ball joint 53 to the second state, the user can make the rotatable range of the first ball joint 52 smaller than that of the first ball joint 52 in the first state. More specifically, the user can change the rotatable range of the first ball joint 52 to 180 degrees by changing the state of the first ball joint 53 to the second state.

For example, after changing the state of the first ball joint 53 to the first state, the user adjusts the position of the image display device 11 such that the half mirror 14 is disposed in front of the left eye. Then, the user changes the state of the first ball joint 53 to the second state. For example, the first ball joint 53 is held in a state that it rotates to one end of the rotatable range, specifically, a state that the protruding portion 241 of the hole 24A is brought into contact with one end of the cut-away portion 21E of the rod portion 21B of the ball stud 21. Then, the user moves the image display device 11 such that no image is projected within the field of view. For example, the first ball joint 53 is held in a state that it rotates to the other end of the rotatable range, specifically, a state that the protruding portion 241 of the hole 24A is brought into contact with the other end of the cut-away portion 21E of the rod portion 21B of the ball stud 21. Here, in the case where the user desires to move the image display device 11 back to the original position, it is only required that the user rotates the first ball joint 53 to the one end of the rotatable range. Thus, the user can more easily move the image display device 11 back to the original position in comparison with the case that the rotatable range of a rotation about the virtual line 212 of the first ball joint 53 is 360 degrees.

<Other Modified Examples>

The present disclosure enables various modifications without being limited to the above described embodiments. In the above description, the first ball joint 2 changes from the first state to the second state to thereby decrease the number of rotatable axes from "3" to "1". In contrast thereto, a mechanism in which the first state is changed to the second state to thereby decrease the number of translational axes may be utilized in place of the first ball joint 2. For example, a translation mechanism in which translation is performed along a plurality of axes (for example, X axis and Y axis) on an X-Y plane may be utilized in place of the first ball joint 2. In this case, a state in which movement along all the plurality of axes is permitted may be regarded as a "first state" while a state in which movement along any of the plurality of axes is prohibited may be regarded as a "second state". Alternatively, a parallel link mechanism in which two ball joints are arranged in parallel may be used in place of the first ball joint 2, for example. In this case, a state in which rotatable axes of the two ball joints are not restricted may be regarded as a "first state" while a state in which a rotatable axis of at least one of the two ball joints is restricted may be regarded as a "second state".

The first ball joint 52 changes from the first state to the second state to thereby decrease the number of positions where it can stop rotating from "non-level" to "six". In contrast thereto, a mechanism in which the first state is changed to the second state to thereby decrease the number of positions where translation can be stopped may be utilized in place of the first ball joint 52. For example, a mechanism that allows the connector 9 to move in the right and left direction relative to the mounting member 8 and be held at any position in the right and left direction (hereinafter, referred to as a "second mechanism") may be provided in the mounting member 8 in place of the first ball joint 52. The second mechanism may allow the connector 9 to be held at non-level in the right and left direction when being changed to the first state. Meanwhile, the second mechanism may allow the connector 9 to be held at any one of a plurality of positions in the right and left direction when being changed to the second state. For example, a parallel link mechanism in which two ball joints are arranged in parallel may be used in place of the first ball joint 52. The number of positions where each of the ball joints can stop rotating may be restricted like the first ball joint 52.

The first ball joint 53 changes from the first state to the second state to thereby decrease the rotatable range from "360 degrees" to "180 degrees". In contrast thereto, the first ball joint 53 may change from the first state to the second state to thereby decrease the translational range. For example, a mechanism that allows the connector 9 to move in the right and left direction relative to the mounting member 8 and to be held at any position in the right and left direction (hereinafter, referred to as a "third mechanism") may be provided in the mounting member 8 in place of the first ball joint 53. The third mechanism may allow the connector 9 to move by a first distance in the right and left direction when being changed to the first state. Meanwhile, the third mechanism may allow the connector 9 to move by a second distance smaller than the first distance in the right and left direction when being changed to the second state.

In the above description, in the case that the user changes a state of the first ball joint 2, 51-53 to the second state to move the image display device 11 such that no image is projected within the user's field of view, the first ball joint 2, 51-53 in this state may be regarded as the third state. This allows the user to appropriately fix the image display device 11 in a state that the image display device 11 is disposed at a position where no image is projected within the user's field of view. Accordingly, the user can prevent the image display device 11 disposed at a position where no image is projected within the user's field of view from being moved back to the position where an image is projected within the user's field of view in accordance with the movement of the first ball joint 2, 51-53.

In the above description, after adjusting the position of the image display device 11 such that the half mirror 14 is disposed in front of the left eye, the user may change the state of the second ball joint 3 from the forth state to the fifth state. Alternatively, an operation of moving the image display device 11 to a position such that no image is projected within the field of view or moving back the image display device 11 to the original position may be performed by only the first ball joint 2. Thus, the user can prevent the image display device 11 disposed at a desired position in front of the eye from being moved.

In the above description, a plurality of second ball joints may be provided. For example, the connector 9 may be constructed by an arm provided with a plurality of movable portions. The image display device 11 may be connected to a tip end of the arm. In this case, a plurality of movable portions may be utilized in place of the second ball joint according to the present embodiment. If the total of the degrees of freedom of the plurality of movable portions is regarded as the degree of freedom of the mechanism corresponding to the second ball joint, the action of the present disclosure can be explained also in this case. The method of changing the state of the first ball joint 2 among the first state to the third state is not limited to a method of adjusting a degree the socket 22 is tightened as described above.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims Further, in the present specification and the attached claims, any item described in the singular includes such items in the plurality unless indicated specifically in the context.

What is claimed is:

1. A head-mounted display comprising:
   a display unit configured to display an image;
   a fixed unit configured to be fixed on a head of a user;
   an adjustment unit that is configured to move and hold the display unit relative to the fixed unit, the adjustment unit being provided with:
   a first adjustment unit connected to the fixed unit, wherein the first adjustment unit is configured to move the display unit relative to the fixed unit with at least one of a first degree of freedom or a third degree of freedom smaller than the first degree of freedom, and adjust a position of the display unit, and a second adjustment unit connected to the display unit, wherein the second adjustment unit is configured to move the display unit relative to the fixed unit with a second degree of freedom, and adjust the position of the display unit; and a degree-of-freedom changing unit configured to selectively change a degree of freedom of the first adjustment unit between the first degree of freedom and the third degree of freedom, wherein the first adjustment unit includes:
  a guide member;
  a moving member configured to be brought into contact with the guide member and slide in a predetermined direction; and
  a pressing member configured to press the moving member against the guide member and bring the moving member into contact with the guide member, wherein the degree-of-freedom changing unit includes a restriction member that restricts movement of the pressing member relative to the guide member, and wherein the restriction member imposes a restriction such that the pressing member is movable relative to the guide member in the predetermined direction in a state that the degree of freedom of the first adjustment unit is the first degree of freedom, and that the pressing member is fixed relative to the guide member in a state that the degree of freedom of the first adjustment unit is the third degree of freedom.

2. The head-mounted display according to claim 1, wherein a number of translational or rotatable axes of the third degree of freedom is smaller than that of the first degree of freedom.

3. The head-mounted display according to claim 1, wherein a translational or rotatable range of the third degree of freedom is smaller than that of the first degree of freedom.

4. The head-mounted display according to claim 1, wherein a number of positions where translation or rotation is stoppable for the third degree of freedom is smaller than that for the first degree of freedom.

5. The head-mounted display according to claim 1, wherein a first frictional force between the restriction member and the pressing member is larger than a second frictional force between the moving member, and the guide member and the pressing member in a state that the degree of freedom of the first adjustment unit is changed to the third degree of freedom by the degree-of-freedom changing unit.

6. The head-mounted display according to claim 1, wherein a range in which the moving member is relatively movable relative to the guide member is larger than a range in which the moving member is relatively movable relative to the pressing member.

7. The head-mounted display according to claim 1, wherein a number of positions where the moving member is relatively movable and stoppable relative to the guide member is larger than a number of positions where the moving member is relatively movable and stoppable relative to the pressing member.

8. The head-mounted display according to claim 1, wherein the first adjustment unit moves, in addition to the display unit, the second adjustment unit relative to the fixed unit with the first degree of freedom or the third degree of freedom.

9. The head-mounted display according to claim 1, wherein the third degree of freedom is smaller than the second degree of freedom.

10. The head-mounted display according to claim 1, wherein the first adjustment unit is a ball joint.

\* \* \* \* \*